(12) United States Patent
Després et al.

(10) Patent No.: US 7,004,615 B2
(45) Date of Patent: Feb. 28, 2006

(54) DISTRIBUTOR FOR DRY CEMENT

(76) Inventors: Étienne Després, 1234, rue de l'Église, Val-Alain, Québec (CA) G0S 3H0; Bernard Riopel, P.O. Box 775, Concord, NH (US) 03301

(*) Notice: Subject to any disclaimer, the term of this patent is extended or adjusted under 35 U.S.C. 154(b) by 0 days.

(21) Appl. No.: 10/394,297

(22) Filed: Mar. 24, 2003

(65) Prior Publication Data

US 2004/0190366 A1    Sep. 30, 2004

(51) Int. Cl.
    *B28C 7/04*    (2006.01)
(52) U.S. Cl. ...................... 366/38; 366/156.1
(58) Field of Classification Search ............ 366/20–21, 366/30–38, 133, 193, 154.1–158.4, 183.1, 366/183.4, 186
See application file for complete search history.

(56) References Cited

U.S. PATENT DOCUMENTS

| 2,665,795 | A |   | 1/1954 | Holwick |
| 3,374,880 | A |   | 3/1968 | Hohl |
| 4,669,886 | A | * | 6/1987 | van Beek |
| 4,956,821 | A | * | 9/1990 | Fenelon |
| 5,352,035 | A | * | 10/1994 | Macaulay et al. |
| 5,624,183 | A | * | 4/1997 | Schuff |
| 5,785,420 | A | * | 7/1998 | Schuff |

FOREIGN PATENT DOCUMENTS

FR          2577161      *  8/1986

\* cited by examiner

*Primary Examiner*—Charles E. Cooley

(57) ABSTRACT

A mobile storage wagon distributing a controlled flow of dry cement. A hopper is provided with a roof (28) over a bin (26) discharging cement into a foldable screw housing (32) to a mixer. The hopper is mounted on legs (30) over a trailer (34). The bin at its lower end has a pair of sealing U gates (76) as guillotines which lead into a feeding chamber (56) with an exit into the screw housing. The U gate has a long flat web (80) and two upward wings (78) which slide in slit square tubes (62). The web slides against an upward rubber piece (84) on the flow side (86) of a tube (62). Each wing is provided with a vertical stopper (82) which rides over the inner face (87) of the tube, thus providing a double seal against dust. An external knife seal is positioned to rub against the web as the web moves to a position to increase or lower the flow of dry cement. The roof is covered by a pair of receiving gates which may be operated from floor level, without need for climbing.

10 Claims, 5 Drawing Sheets

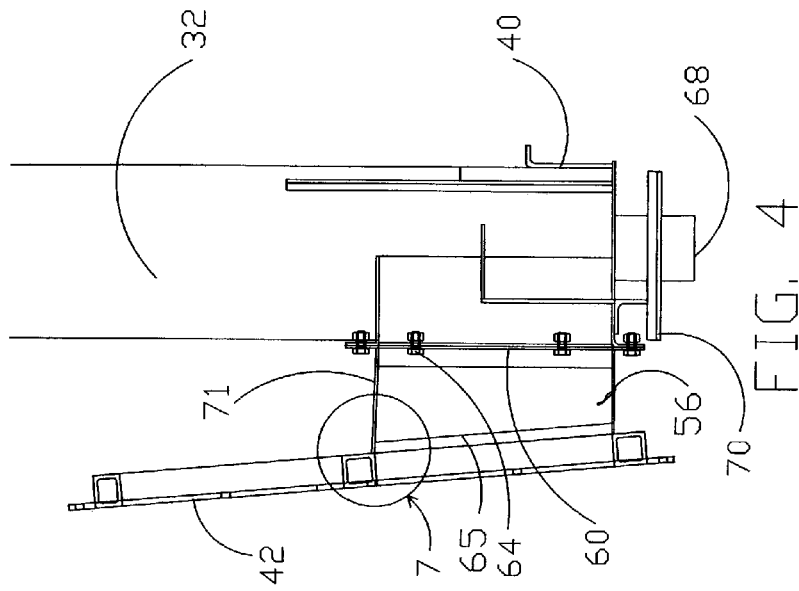
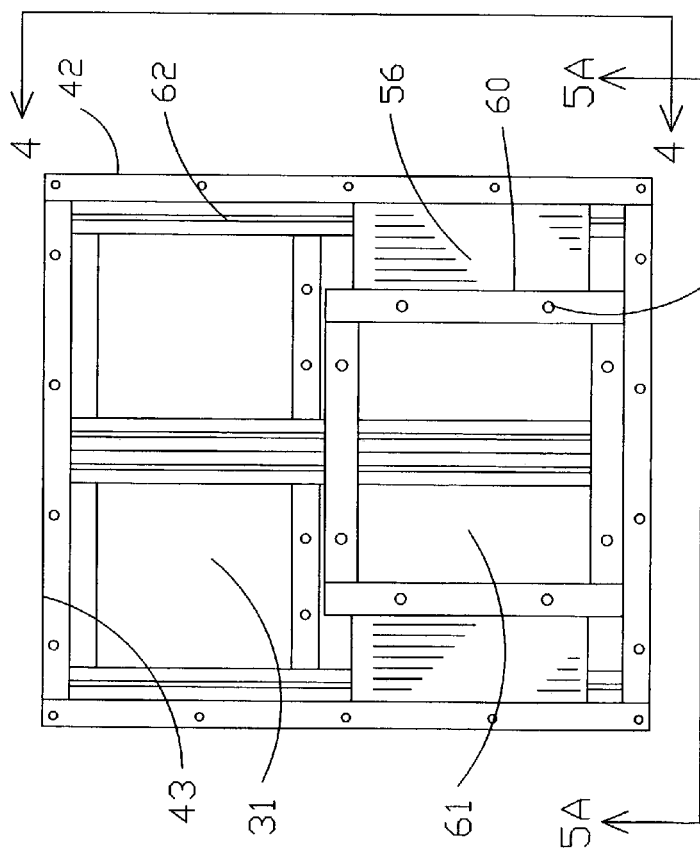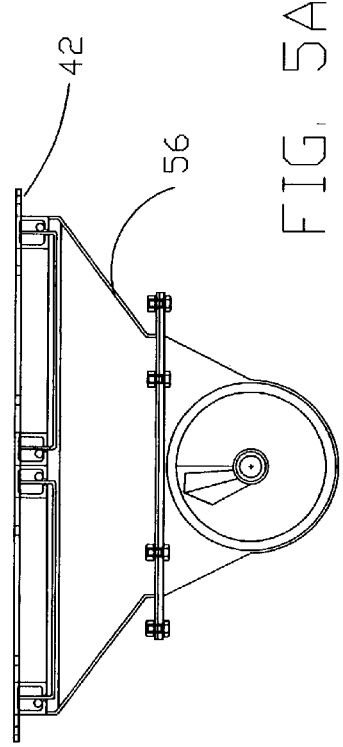

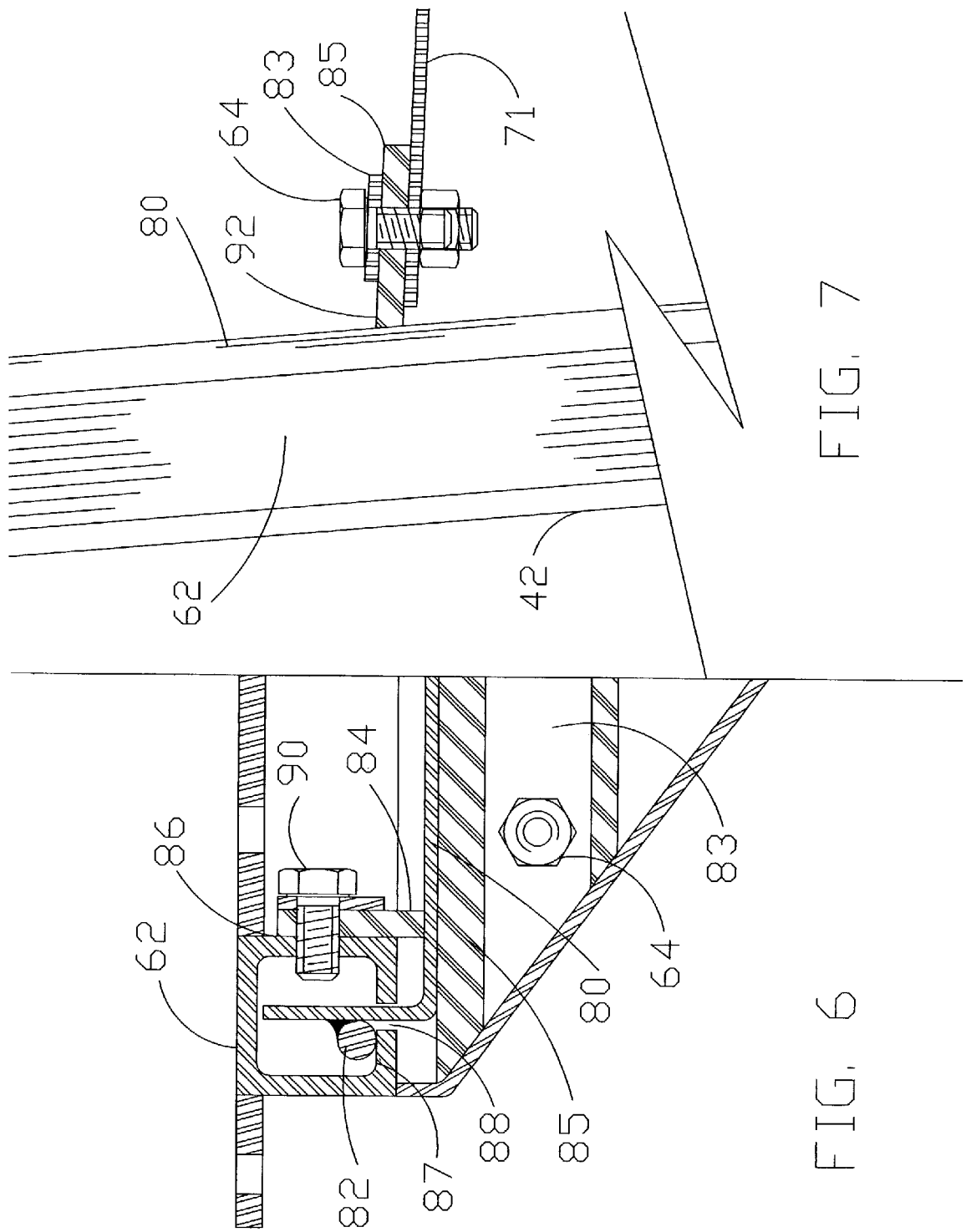

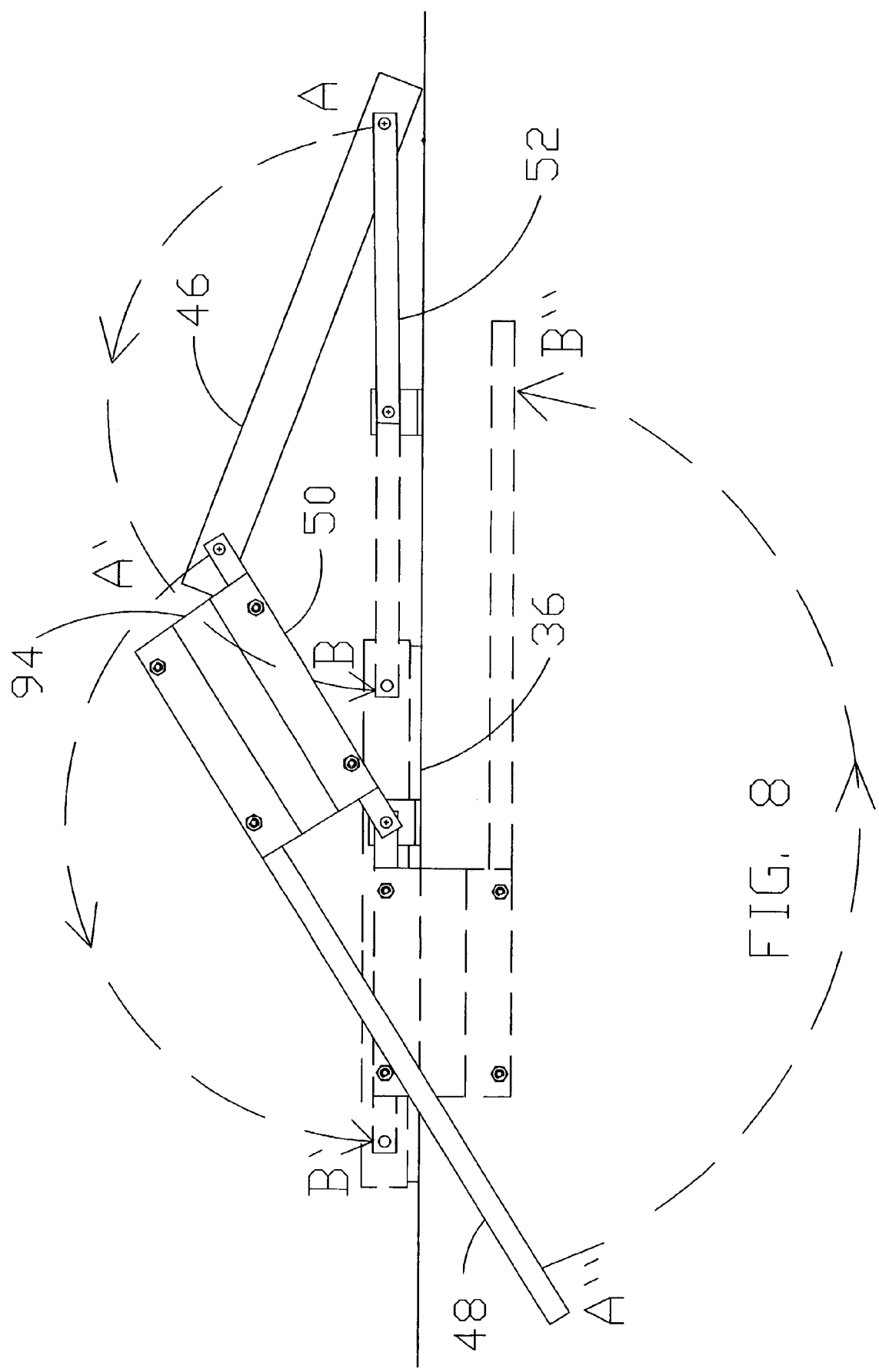

DISTRIBUTOR FOR DRY CEMENT

BACKGROUND OF THE INVENTION

1. Field of the Invention

This invention relates to dry cement handling and distribution particularly for use on construction sites.

2. Description of the Prior Art

In construction, it is of current use to displace heavy bags of cement from a location to a distributor which feeds a ready mix. Previous methods involve delivering dry cement in predetermined quantities. The problem is the exact measurement of the quantities needed for the blend. Also, the handling of dry cement causes a seepage of dust representing risks for the security of workers in the vicinity. Known equipment requires the presence of more than one worker for the handling operation and distribution of the cement: numerous operations to control the intake and delivery of dry cement involve the constant supervision of the equipment to prevent accidents.

OBJECTS OF THE INVENTION

It is a general objective of the invention to provide a distributor for dry cement which may handle large bags of dry cement, store them in a hopper and feed the powder therefrom to a mixer in an environment which is dustless and to provide a distributor wherein the flow of dry cement is manually controlled by a single operator.

A more elaborate objective is to provide a distributor which receives cement bags from cement plants, transports them to the proximity of a mixer, serves as storage for a quantity of bags. Upon the action of an operator the objective is to provide an openable gate with a controlled aperture which measures a quantity of cement into a feeding chamber discharging into a screw feeding a mixer, and provides a dustless environment.

A more precise objective is to provide a U type of gate with a double seal, one seal along a horizontal plane and a seal along a vertical plane.

Other objects and advantages of this invention will become apparent during the course of the following detailed description.

BRIEF DESCRIPTION OF THE DRAWINGS

In the accompanying drawings, forming a part of this specification, and wherein similar reference characters for corresponding parts through the several views:

FIG. 3 is an enlargement of area of arrow 3 of FIG. 2.
FIG. 4 is a side view according to line 4—4 of FIG. 3.
FIG. 5A is a side view according to line 5A—5A of FIG. 3.
FIG. 6 is an enlargement of area of arrow 6 of FIG. 5B.
FIG. 7 is an enlargement of area of arrow 7 of FIG. 4.
FIG. 8 is an enlargement of area of arrow 8 of FIG. 2.

DETAILED DESCRIPTION OF THE PREFERRED EMBODIMENT

Figures 1, 2:
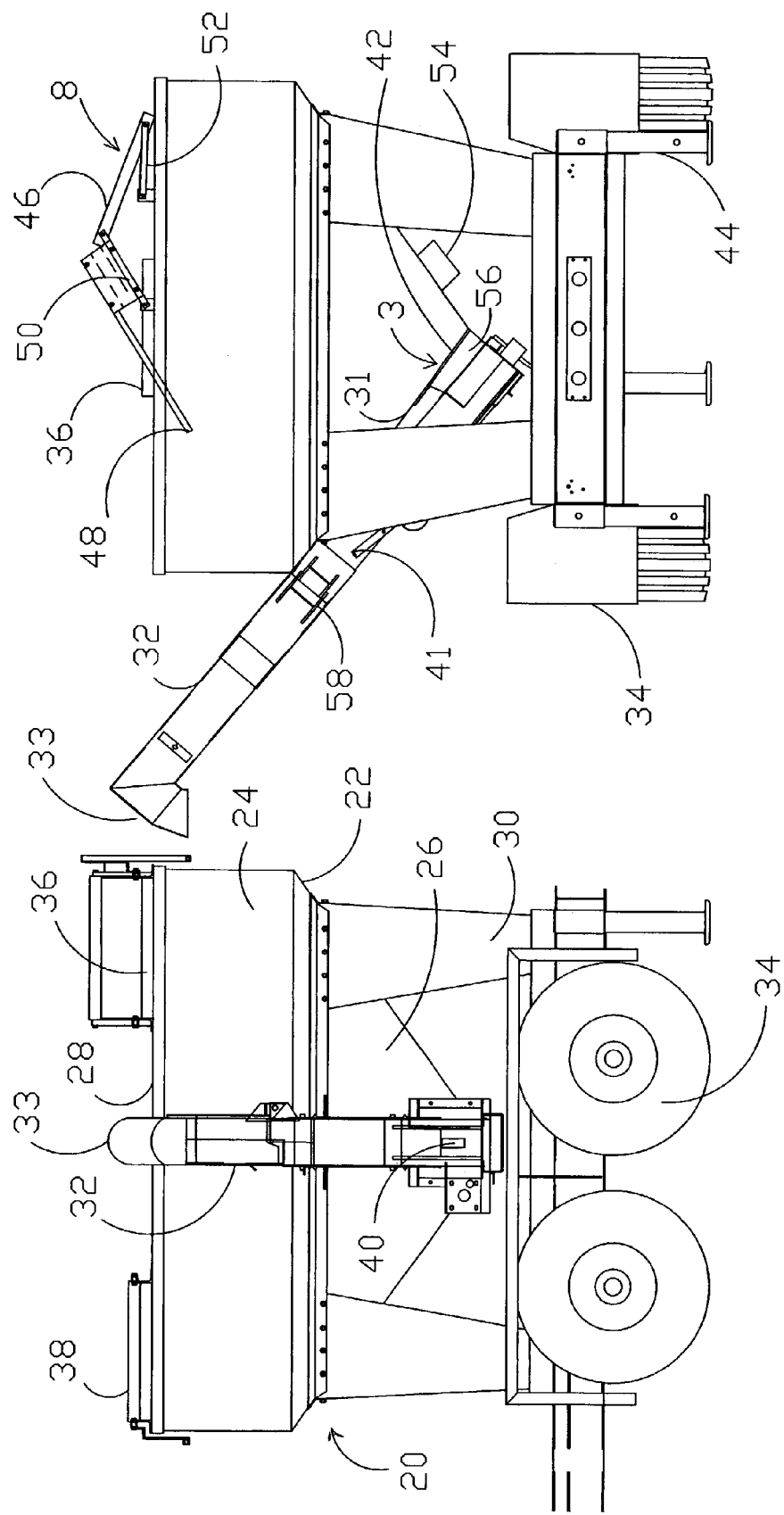
FIG. 1 is a side view of a distributor on wheels.
FIG. 2 is an end view of the distributor of FIG. 1.

An embodiment of the invention is illustrated in the drawings wherein the same numbers identify the same characterizing elements.

FIG. 1 shows a distributor 20 identified by an arrow and mounted on a trailer frame. A hopper 22 comprises a reservoir 24 on top of a sloping bin 26. The reservoir is topped by a roof 28 and it is supported on legs 30. From the base of the sloping bin 26 stems a screw housing 32 topped by a screw end 33. The trailer frame is identified by wheels 34. The roof 28 comprises an opened back door 36 and a closed front door 38. At the bottom of the screw housing 32 appears a cleaning gate 40.

FIG. 2 shows more particularly a bin wall 31, a gate handle 41, which may be replaced by a jack type handle, an area for a trap frame 42, trailer legs 44, an open cover 46 which is moved by a manual lever 48 disposed a certain distance away from a leading arm 50 which leads the open cover 46 into a shut position. A lagging arm 52 follows the movement of the open cover. The sloping, bin is provided along its sloping face with a vibrator 54, and at its bottom end with a feeding chamber 56 just above the bottom end of the screw housing 32. The screw housing along with its inside screw may be shortened by means of a folding hinge 58.

FIG. 3 shows the trap frame 42 surrounding a housing frame 60; one can see an upper part 43. Four slit square tubes 62 lie within a plane surrounded by the trap frame 42. Under a pair of blank openings located between the square tubes 62 is the bin wall 31, which is not apparent. That opening is to be later covered by a U gate 76 later illustrated in FIG. 5B. In the middle of the housing frame 60 is a discharge opening 61. The housing frame 60 is separated from the trap frame 42 by the distance of the height of the feeding chamber 56. Bolts 64 serve to fix the housing frame 60.

FIG. 4 indicates a relative depth position between the trap frame 42 and the housing frame 60. Bolts 64 are apparent. The cleaning gate 40 is shown; so is the sloping side of the feeding chamber 56, a fold 55 in the feeding chamber construction plate and an end support plate 71. Also shown is the position of a central block 68 provided with an extension 70 to support a screw.

FIG. 5A shows the trap frame 42 over the feeding chamber 56. The trap frame follows the slope of the sloping bin 26 which is preferably 45°.

Figure 5B:
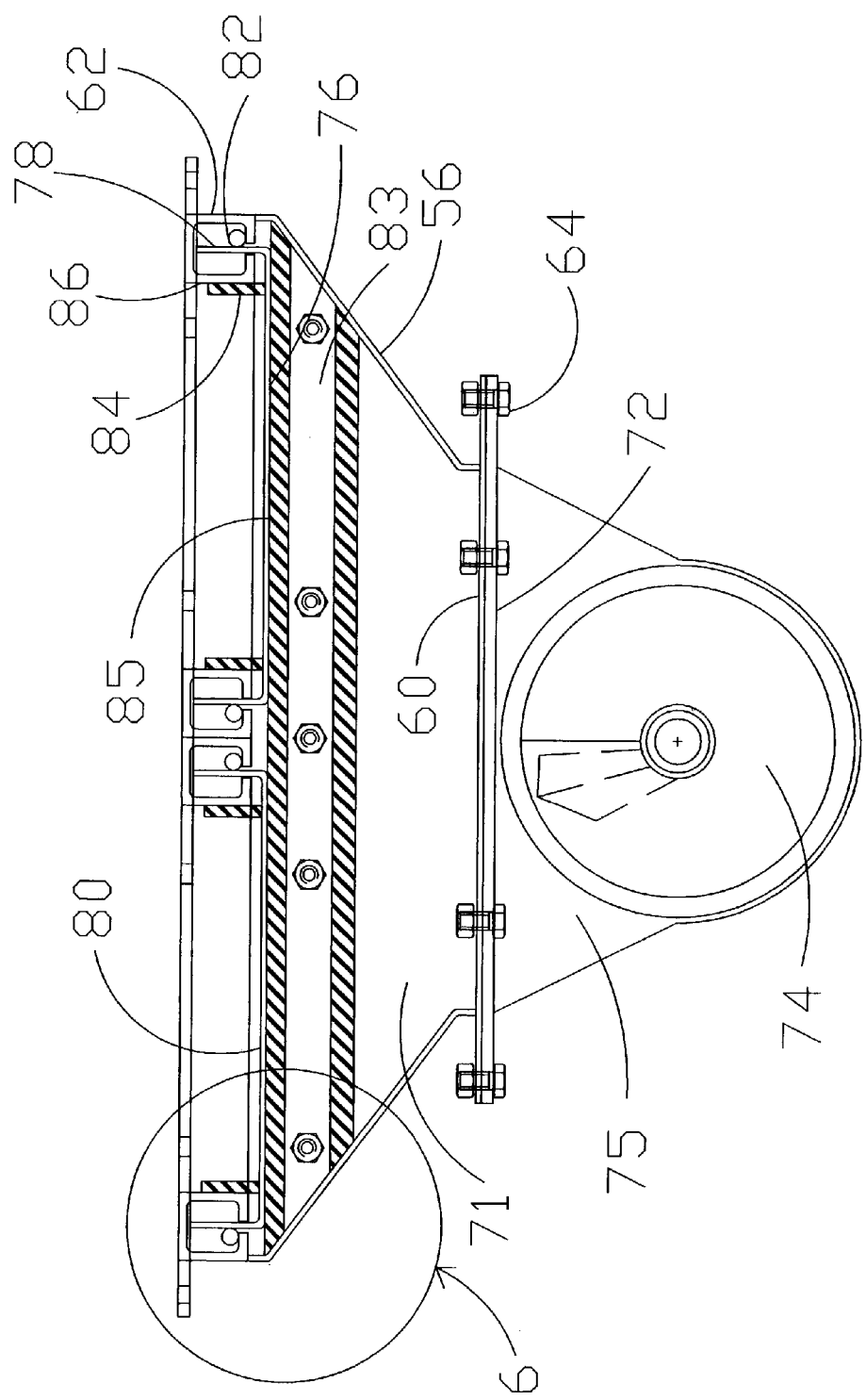
FIG. 5B is an enlargement of FIG. 5A.

FIG. 5B shows the housing frame 60 and an inferior plate 72 which holds a screw auger 75. The inferior plate and the housing frame are bolted together by bolts 64 and are both opened in the middle to let pass the flowing dry cement. A pair of U gates 76 each comprise a web of gate 80 and two wings of gate 78. The wings 78 terminate within the slit square tubes 62 and possess a vertical stopper 82. A pair of horizontal stoppers 84 are disposed against the flow side 86 of the slit square tube. The end support plate 71 is covered at its upper end by an external knife seal 85 against which the web of gate 80 may slide to be kept clean; this cleaning operation is also to prevent the introduction of rain, mud, snow or wind dust. A metal blade 83 is used to maintain the external knife seal against the end support plate. A screw 74 is located within the screw auger 75. The horizontal stopper 84 is preferably made of rubber.

FIG. 6 shows an inner face 87 to the slit square tube 62. A tube slit 88 is present at a lower end of the tube 62 and the passage of dust which may find its way into the square tube 62 is prevented from passing into the slit 88 by the vertical stopper 82. Nevertheless if the dust passes through the slit it ends behind the external knife seal 85 and into the feeding chamber 56. The horizontal stopper 84 is fixed to the flow side 86 by means of a tightener 90. When opening or closing or partly moving the U gate the vertical stopper 82 slides against the inner face 87 and the web of gate 80 slides against the horizontal stopper 84 and at the same time it slides against the external knife seal 85. The only moving part is the U gate 76.

FIG. 7 shows the end support plate 71 holding the external knife seal 85 by means of the metal blade 83 and anchored by bolt 64. A scraping excess 92 maintains contact with the web of gate 80. The trap frame 42 is visible and so is the slit square tube 62.

FIG. 8 shows the working of the back door 36. The movement illustrated by dotted circles and by dotted lines is carried out from position A to position B, and similar for positions A' to B' and A" to B". The manual lever 48 is disposed at an arm distance 94 away from the leading arm 50. The leading arm 50 pivots about a point and traces a circle A'-B' and being tied to the open cover 46, it leads the open cover from open position into, a shut position, whereupon the lagging arm rests at point B. The lagging arm 52 follows the movement of the open cover. The lever 48 follows a path from A" when the cover is open to B" when the cover is closed. The lever 48 is parallel and positioned a certain arm distance 94 away from the leading arm: the above geometry provides a method to effectively close the cover without interfering: the handle is maintained below the roof and it is accessible to an operator from below the hopper and while operating the U gate. No second operator is needed.

SUMMARY AND RAMIFICATIONS

A distributor for controlled flow of powdered material into a mixer, the distributor comprising:
hopper means to funnel the powdered material into a small section,
an intermediary chamber to provide a discrete, a continuous or a semi-continuous quantity of the powdered material, dry cement or other material, the intermediary chamber being located between the hopper means and the mixer,
means for discharging the powdered material from the intermediary chamber to the mixer,
a controllable gate located between the hopper means and the intermediary chamber comprising first means to seal flowing material normal to the direction of the controlled flow, thereby allowing the material passing into the intermediary chamber and
second means to seal exceeding material passing across the first means to seal.

The intermediary chamber comprises a screw housing 32 defining a receiving part and a round bottom, and the means for discharging comprise a screw located at the bottom of the housing and directed to the mixer.

Hopper means comprise a roof 28 over a sloping bin 26 discharging the material into the screw housing 32, the roof comprising a pair of doors 36, 38 comprising means for operating the doors from a level below the roof. Furthermore a straight reservoir 24 is located below the roof and above the sloping bin; the controllable gate preferably comprises a second controllable gate, which makes it a twin gate, the hopper means comprise a separation membrane or steel plate dividing through the reservoir, the sloping bin and the controllable gates, the action of one controllable gate causing the use of material from one door excluding the other, thereby permitting the functioning of either gate alternately and permitting the loading through one door while the second door is closed and material is drawn.

The hopper is preferably mounted on legs 30 over a trailer 34, the means for discharging the powdered material from the intermediary chamber to the mixer is a screw housing receiving material from the intermediary chamber and feeding a screw, the screw and screw housing comprising a folding hinge 58 to facilitate transportation.

The controllable gate comprises a U gate 76 and means for fixing the U gate to a small bottom section. The U gate comprises a long flat web 80 and two perpendicularly directed wings 78, the U gate further comprises an open inferior plate 72 which permits a continuous discharge. A guillotine gate at this level may be used to produce a discrete volume of the material for automation.

For fixing the U gate there is preferred a trap-frame 42 next to the bottom, mounted on a bin wall 31 and comprising a pair of slit square tubes 62 the wings passing in a slit 88 of the s lit square tube 62 and comprising a vertical stopper 82 for sliding along an inner face 87 of the tubes.

The slit square tubes comprise a flow side face 86 comprising a horizontal stopper 84 mounted to scrape the web of gate 80, the movement of the web against the horizontal stopper 84 defining the first means to seal, the vertical stopper 82 providing the second means to seal any dusty material passing between the horizontal stopper 84 and the web 80.

Under the web 80 there is located an external knife seal 85 thereby providing extra cleanliness to the web on its external surface. The external knife seal is preferably mounted on the upper end of an end support plate 71 supported along the feeding chamber 56. The discharge opening 61 leads into the feeding chamber 56 with an exit into the screw housing.

Applications: It is possible to use the distributor for prepared cement such as a mixture of sand and dry cement. The distributor may be positioned on the frame of a truck. The roof may be sealed by means of a two inch (5 cm) rubber foam around the edges of the roof and the doors 36, 38 sealed by means of a similar rubber foam.

A gas engine may be used to operated a hydraulic pump which runs a hydraulic motor turning the screw. A valve controls the advance of the material along the screw. A flexible tube or canvas may be added at the discharge end 33 of the screw to deposit the material into the mixer without dust falling.

It is clearly understood that the embodiments of this invention which were described above, in reference to the annexed drawings, were given as an indication and are by no means restrictive, and modifications and adaptations thereof can be implemented without the object deviating from all the framework of this invention.

We claim:
1. A distributor for controlled flow of powdered material into a mixer, said distributor comprising:
hopper means to funnel said powdered material into a small funnel end,
an intermediary chamber (56) to provide a quantity of said powdered material, said intermediary chamber being located between said hopper means and said mixer,
means for discharging said powdered material from said intermediary chamber to said mixer,
a controllable gate located between said hopper means and said intermediary chamber comprising first means (84) to seal flowing material normal to the direction of said flow thereby allowing said material passing into said intermediary chamber and
second means (82) to seal exceeding material passing across said first means to seal.
2. The distributor of claim 1 wherein said intermediary chamber comprises a screw housing (32) defining a receiv- ing part (75) and a round bottom, and said means for discharging comprise a screw (74) located within said housing and directed to said mixer.

3. The distributor of claim 2 wherein said hopper means comprise a roof (28) over a sloping bin (26) discharging said material into said screw housing (32), said roof comprising a pair of doors (36,38) comprising means for operating said doors from a level below said roof.

4. The distributor of claim 3 wherein said hopper means further comprise a straight reservoir (24) located below said roof and above said sloping bin, said controllable gate being a twin gate, each gate functioning separately, said hopper means comprising a separation membrane dividing said reservoir, said sloping bin and said controllable gates, the action of one controllable gate causing the flow of material from one door excluding the other, thereby permitting the functioning of either gate alternately and permitting the loading through one door while the second door is closed and material is drawn therefrom.

5. The distributor of claim 1 wherein said hopper is mounted on legs (30) over a trailer (34), said means for discharging said powdered material from said intermediary chamber to said mixer is a screw housing comprising a screw and receiving material from said intermediary chamber (56) and feeding said mixer, said screw, and said screw housing thereof comprising a folding hinge (58) to facilitate transportation therefore.

6. The distributor of claim 1 wherein said controllable gate comprises a U gate (76) and means for fixing said U gate to said small funnel end, said U gate comprising a long flat web (80) and two perpendicularly directed wings (78), said U gate further comprising an open inferior plate (72) which permits the discharge of a restricted volume of said material into said intermediary chamber.

7. The distributor of claim 6 wherein said means for fixing said U gate is a trap frame (42) next to said small funnel end, said trap frame being mounted on a bin wall (31) and comprising a pair of slit square tubes (62), said wings passing in a slit (88) of said slit square tubes (62), and comprising a vertical stopper (82) acting as a second means for sealing when sliding along an inner face (87) of said tube.

8. The distributor of claim 7 wherein each said slit square tube comprises a flow side face (86) comprising a horizontal stopper (84) mounted therefrom to scrape said web of gate (80), the movement of said web against said horizontal stopper (84) defining said first means to seal, said vertical stopper (82) providing said second means to seal any material passing between said horizontal stopper (84) and said web (80).

9. The distributor of claim 8 wherein said intermediary chamber (56) comprises an end support plate (71), carrying an external knife seal (85) directed towards an external surface of said web (80), said external surface passing over said external knife seal (85) thereby providing extra cleanliness to said web.

10. The distributor of claim 9 wherein said material, when said gate (80) is opened, proceeds into said feeding chamber (56) with an exit into a screw housing (32).

* * * * *